Sept. 20, 1960

G. L. SULLIVAN 2,953,732

INDUCTION MOTOR CONTROL SYSTEM

Filed July 8, 1959

*INVENTOR.*
GERALD L. SULLIVAN
BY *Richard E. Hosley*
HIS ATTORNEY

United States Patent Office 2,953,732
Patented Sept. 20, 1960

2,953,732
INDUCTION MOTOR CONTROL SYSTEM

Gerald L. Sullivan, West Peabody, Mass., assignor to General Electric Company, a corporation of New York Filed July 8, 1959, Ser. No. 825,797

5 Claims. (Cl. 318—207)

The present invention relates to an induction motor control system and, more particularly, to a control system for an induction motor of the type having two-phase excitation and control windings.

Two-phase induction motors are frequently used to position an output shaft in a closed loop servo system to correspond with a command from a signal source. Generally, one phase (the excitation phase) is excited from a voltage source of relatively constant magnitude, while the other phase (the control phase) receives its excitation from the signal source through appropriate amplification means. Care is taken to assure that the currents in the windings from each of these sources will be in time quadrature when the signal is of a phase that should produce maximum torque. When correspondence is achieved between output and input, the torque-producing component of the signal becomes zero and the motor torque should, likewise, become zero. Any residual torque produced by the voltage applied to the excitation winding will cause the output shaft position to deviate from correspondence by an amount such as to produce a counterbalancing torque from the signal source.

Two-phase induction motors for control systems are carefully designed to minimize transformer coupling between phases; however, such coupling does exist to some extent and a portion of the voltage applied to the excitation phase will be induced into the control phase. This induced voltage will produce a current through the control phase winding when an external impedance is connected to the control phase terminals. A torque will be produced whenever the external impedance is such as to cause the circulating current in the control phase winding to differ in time phase from the current in the excitation phase winding. This torque will produce a correspondence error as described above.

The internal impedance of the amplifier supplying power to the control phase permits a circulating current to be produced by the induced voltage in the control phase. Generally, however, the resultant torque is of small magnitude and can be tolerated. In many instances, however, the control phase is tuned to parallel resonance so that a resistive amplifier load will be obtained and so that the phase shift through the amplifier will be minimized. A further reason for tuning the motor impedance is to suppress harmonics at the control phase. The tuning capacitor used for this purpose, however, presents a series resonant or low impedance circuit to the voltage induced in the control phase by transformer coupling from the excitation phase. This accentuates the circulating current markedly. Furthermore, the phase of this current will be similar to the phase of the induced voltage, while the phase of the current through the excitation winding will lag the induced voltage by nearly 90 degrees. The combination of these effects will frequently produce an undesirably large single-phasing torque. The resultant correspondence error will be inversely proportional to the open-loop gain of the system. This is particularly troublesome when the system is designed with a zero-gain or dead-band region surrounding the null point of the signal. In the dead-band region there is no counteracting torque available from the signal source. Therefore, any tendency for the single-phasing torque to drive the output through the dead-band will be unimpeded. The final settling point for the servo will always be at the same end of the dead-band regardless of the manner in which the dead-band has been approached. Therefore, any effort to center the output within the dead-band will be futile once the centering means has been removed.

A similar problem exists with an open loop system in that the output will be driven when the control signal is zero. Therefore, a biasing signal would be required in order to keep the motor at standstill.

Accordingly, the primary object of the present invention is to provide an induction motor control system utilizing a two-phase induction motor with a tuned control phase winding in which undesired single-phase operation of the induction motor caused by transformer coupling between the excitation and control phase winding is substantially reduced or eliminated.

Further objects and advantages of the invention will become apparent as the following description proceeds.

Briefly, in accordance with one aspect of this invention, an arrangement is provided in which the tuning capacitor, which is normally connected across the control phase winding of the servomotor, is effectively disconnected from the circuit when the control voltage supplied to the control winding is below the value required for two-phase operation of the servomotor from the signal source as when the control signal voltage is at or near zero. With the capacitor removed from what would otherwise be a series resonant circuit, the circulating current in the control winding, caused by transformer coupling with the excitation winding, is reduced to the point where undesired single-phase operation of the servomotor is effectively precluded. In a preferred embodiment of the invention, the tuning capacitor is effectively disconnected from the circuit by use of a non-linear bilateral impedance connected in series with the capacitor. This impedance offers a low average impedance for high alternating control voltages normally supplied to the control winding for two-phase operation of the servomotor. However, with low control voltages, such as result from transformer coupling between the excitation and control windings, the impedance presents a high average impedance so that the tuning capacitor is effectively disconnected from the circuit.

For a better understanding of the invention, reference should be made to the following detailed description taken in connection with the accompanying drawings in which.

Figure 1:
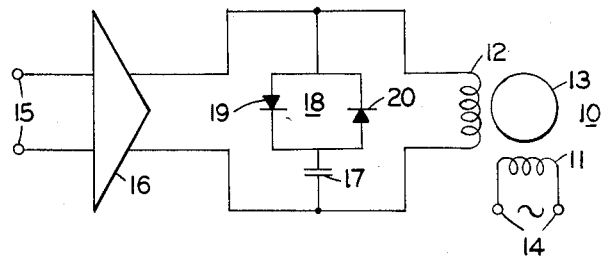
Fig. 1 shows a control system for a two-phase induction motor having means for automatically disconnecting the tuning capacitor from the control phase winding of the motor in accordance with the invention.
Figure 2:
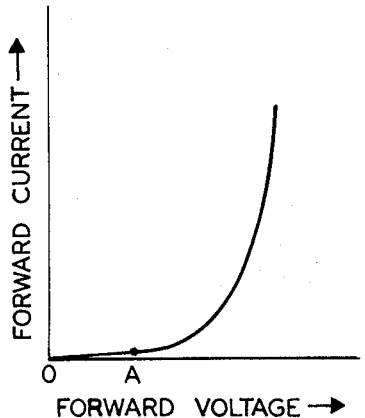
Fig. 2 is a graphical representation of the current and voltage relationships existing in the non-linear impedance circuit element of Fig. 1 useful in explaining the operation of the system.

Referring to Fig. 1 of the drawing, there is disclosed a control system for a two-phase induction motor which embodies the subject invention. The system comprises a two-phase induction motor 10 of well-known construction, having an excitation phase winding 11 and a control phase winding 12 arranged in quadrature relation to produce a rotating magnetic field which causes rotation of the rotor in a direction dependent on the direction of rotation of the magnetic field in a known manner. The excitation winding 11 has terminals 14 for connection to a suitable source of alternating current.

Two-phase induction motors of the type illustrated are commonly used as a servomotor in servo systems wherein the motor provides the power required for remote positioning or control purposes. In such systems an alternating current control signal is used, the polarity and phase of which, relative to the polarity and phase of the alternating current voltage supplied to the excitation winding of the motor, determine the direction of rotation of the motor.

In the system illustrated, a reversible polarity control signal supplied by a suitable signal source not shown is applied to input terminals 15 and is amplified by a polarity sensitive amplifier 16, the output of which is connected through a control circuit to energize the control winding 12 of the motor. With this arrangement, the motor 10 rotates in response to a control signal applied to the input terminals 15 and the direction of rotation of the motor is determined by the polarity of the control signal. Amplification of the control signal is usually required in order to obtain sufficient alternating current power to cause proper operation of the induction motor. It will be appreciated that the system illustrated may be used in a closed loop servo system in which the servomotor drives a remote device to a position in correspondence with the position of a transmitter device which provides the control signal. In these systems there is an electrical or mechanical feedback which reduces the control signal of the transmitter to zero when the positions of the transmitter and receiver correspond. The system may also be used in open loop control systems in which a remote device is positioned by a transmitter, such as for example a selsyn, which is actuated in either direction from a null voltage position to give a control signal of the desired polarity. Transmitter and feedback elements of open and closed loop servo systems, in which the induction motor control of the present invention may be advantageously used, are not shown since they are well known and do not form a part of the invention here involved.

In a motor control system of the type illustrated, it is desirable to have the net impedance of the load circuit connected to the amplifier resistive in character in order to reduce the harmonic content of the amplifier output. Also, operation of the amplifier at unity power factor improves its operating efficiency. In order to eliminate the reactive component of the amplifier load as would otherwise be caused by the inductive reactance of the control winding 12, it is common to connect a tuning capacitor in parallel with the control winding, the size of the capacitor being related such that the capacitive reactance of the capacitor is substantially equal to the inductive reactance of the control winding at the operating frequency. The amplifier load then constitutes a parallel connected capacitor and motor control winding tuned for parallel resonance and the net impedance of the amplifier is resistive in character. In the control system used, the usual tuning capacitor 17 is shown connected across the motor control winding through non-linear impedance means indicated generally at 18, the function of which will become apparent as the description proceeds.

If the non-linear impedance means 18 were omitted, the capacitor 17 would be connected directly across the control winding 12 which is a common arrangement in the prior art. Such an arrangement gives rise to a difficulty in the form of undesired single-phase operation (rotation) of the motor when the control signal applied to input terminals 15, the output of amplifier 16, and hence the voltage applied to control winding by the amplifier is substantially zero. This is caused by transformer coupling between the excitation winding 11 and the control winding 12 which causes induced current to flow if the output of the control winding is connected through an impedance. While this effect can be reduced by a considerable extent by good induction motor design, it cannot be eliminated entirely. Where a tuning capacitor is connected across the control winding, there exists a low-impedance, series-resonant circuit comprising the control winding 12 and the tuning capacitor 17 through which this induced current circulates. In many cases, the magnitude of this circulating current is sufficient to cause rotation of the motor when the voltage applied to the control winding by the amplifier 16 is zero or a very low value.

When this condition, called single-phase motor operation, exists, it causes correspondence error in closed loop servo systems since the motor will rotate until a counterbalancing torque is applied by the control winding which can only result when there is a correspondence error between the signal transmitter and the remotely positioned device. Furthermore, in such systems where there is a wide, so-called dead band (no control signal) for stability or other purposes, single-phase operation of the motor will cause the controlled element to seek one side of the dead band in the absence of special centering means. This results in unsymmetrical operation of the servo system. Further, in open loop servo systems, single-phase operation of the motor will cause the remotely positioned element to run to the extreme limit of its travel if no control signal is applied and this is obviously undesirable. Then, too, there is the possibility that the amplifier may become disconnected from the motor control winding; in such a case, the servomotor should not operate.

The difficulties referred to above, caused by single-phase operation of the servomotor are eliminated in accordance with the present invention, by effectively disconnecting the tuning capacitor 18 from the circuit when the voltage supplied to the control winding 12 by the amplifier is below that supplied by the excitation winding 11 by transformer action. This condition exists when the control signal applied to the input terminals 15 (and hence the output of the amplifier 16) is at or near zero. This is accomplished by connecting the non-linear impedance 18 in circuit with the tuning capacitor as illustrated. It will be noted that the non-linear impedance 18 and the capacitor 17 are in series and the combination of elements is in parallel with both the amplifier output and the control winding 12. With this arrangement, the non-linear impedance is subjected to the output voltage of the amplifier 16 and also the voltage across the control winding 12.

Figure 3:
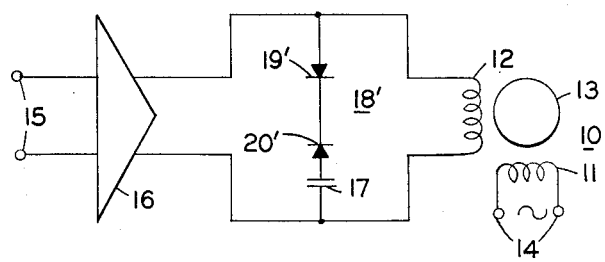
Fig. 3 is a modification of the system of Fig. 1, showing a different arrangement of non-linear impedance elements.

The non-linear impedance 18 of Fig. 1 comprises a pair of parallel connected diodes 19 and 20 which are polarized as shown for symmetrical conduction of alternating current. Use is made of the fact that the diodes 19 and 20 have a non-linear impedance when subjected to a varying voltage in a forward (conducting) direction. Fig. 3 of the drawing shows a typical curve for a silicon diode identified as 1N645 to 649 series. It will be noted that the impedance of the diode subjected to a forward voltage is quite high until a voltage corresponding to the point A is reached beyond which the impedance decreases and the current increases rapidly. In a typical induction motor such as the one illustrated, the excitation voltage applied to the excitation winding 11 may be of the order of twenty-six volts and the voltage applied to the control winding 12 by amplifier 16 for full input control signal voltage may be of the order of 75 volts. In such a motor, the voltage induced in the control winding 12 by the excitation winding 11 by transformer action is generally of the order of 0.2 to 0.6 volt. In order to have the non-linear impedance element 18 function effectively to disconnect the tuning capacitor 17 from the circuit when the amplifier output is near zero (when the control signal is near zero and the induction motor should be stationary), the diodes 19 and 20 are selected on the basis of their impedance characteristic so that they present a low average impedance when the applied voltage is high and a high average impedance when the applied voltage is low. Thus, in the example given, silicon diodes of the type mentioned have a high impedance when the applied forward voltage is of the order of 0.6 volt and a low average impedance when the applied voltage is substantially in excess of 0.6 volt. Thus, when the control signal is applied to input terminals 15 and the output of the amplifier applied to the control winding 12 and the non-linear impedance 18 has a value substantially in excess of 0.6 volt, the impedance of element 18 is low and tuning capacitor 17 functions in the normal manner. On the other hand, when the signal input and amplifier output is near zero, the voltage applied to the non-linear impedance 18 is only that induced in the control windings 12 by transformer action and this will be relatively low, of the order of 0.6 volt or less. For this condition, the average impedance of the non-linear impedance 18 is high so that the tuning capacitor is effectively disconnected from the circuit. This detunes the circuit including the control winding 12 so that the impedance across the winding 12 is high and the induced current is kept low. Furthermore, the effective removal of the tuning capacitor from the circuit shifts the phase angle of the induced current relative to the current in the excitation winding in a direction to reduce motor torque. The combination of these effects effectively precludes single-phase operation of the induction motor.

It will be understood that with different normal operating voltages of the motor control winding, diodes with correspondingly different operating characteristics will be selected. For example, it is quite common to use an operating voltage on the control winding as well as the excitation winding of 26 volts. For this application, germanium diodes have been found to have the desired cut-off or threshold voltage to accomplish the desired disconnecting action.

Figure 4:
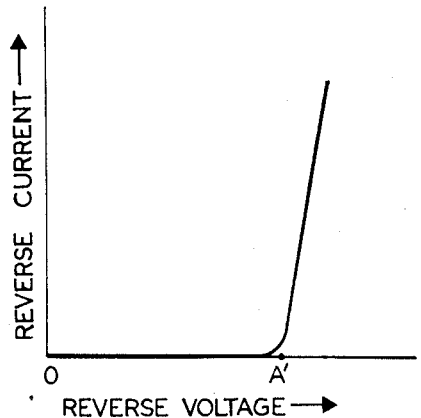
Fig. 4 is a graphical representation of the current and voltage relationship existing in the non-linear impedance element of the system of Fig. 3, useful in explaining the operation of the system.

In Fig. 3 of the drawing, there is shown a motor control system similar to the one shown in Fig. 1 and like components have been identified by the same reference numerals. However, in this modification, a different non-linear impedance element 18′ is used. Thus, it will be noted that connected in series with the tuning capacitor are a pair of series-connected diodes 19′ and 20′ connected back-to-back. These diodes may be silicon diodes known in the art as Zener or voltage reference diodes. These diodes are characterized by having a very high resistance when subjected to reverse voltages up to a critical or threshold value of reverse voltage at which the resistance decreases abruptly to a relatively low value. The characteristic is shown by the curve of Fig. 4 from which it will be noted that the impedance is very high and the current low for reverse voltage values up to the point A′ at which the impedance drops and the current rises sharply. By connecting two Zener diodes 19′ and 20′ back-to-back as shown, the reverse voltage characteristic of each predominates during alternate half cycles so that there is symmetrical conduction of alternating current at voltages above the point A′. It will be clear that, by proper selection of the voltage point A′ relative to the output voltage of amplifier 16 and the induced voltage in control winding 12, the switching action of the diodes may be utilized effectively to disconnect the tuning capacitor 18 from the circuit to prevent single-phase operation of the motor 10. In general, the Zener diode arrangement of Fig. 3 is better suited for use with induction motor control systems in which the induced voltage in the control winding is higher; i.e., of the order of 3 volts. For such use, Zener diodes of the type identified as 1N747 are suitable.

While there are shown and described particular embodiments of the invention, it will occur to those skilled in the art that various changes and modifications may be made without departing from the invention; and it is therefore intended in the appended claims to cover all such changes and modifications as fall within the true spirit and scope of the invention.

What I claim as new and desire to secure by Letters Patent of the United States is:

1. A motor control system comprising an induction motor having two-phase windings in quadrature relation comprising an excitation winding and a control winding, means for connecting said excitation winding to a source of alternating current, a control circuit including an amplifier supplying an alternating current control voltage to said control winding to effect controllable two-phase operation of said motor, a tuning capacitor connected in parallel with said control winding to eliminate reactive components from the current in said control circuit supplied by said amplifier, and disconnecting means responsive to the magnitude of said control voltage for effectively disconnecting said tuning capacitor from said control circuit when said control voltage is below the value required for two-phase operation of said servomotor whereby undesired single-phase operation of said servomotor caused by current induced by the excitation winding in a series resonant circuit including said capacitor and said control winding is prevented.

2. The combination defined by claim 1 wherein the disconnecting means is non-linear impedance means connected in circuit with said capacitor and the non-linear impedance means comprises two parallel connected diodes polarized for symmetrical conduction of alternating current.

3. The combination defined by claim 1 wherein the disconnecting means is a non-linear impedance means connected in circuit with said capacitor and the non-linear impedance means comprises a pair of serially connected Zener diodes connected back-to-back.

4. A motor control system comprising an induction motor having an excitation winding and a control winding, means connecting said excitation winding to a source of alternating current, means supplying an alternating current control voltage to said control winding, a capacitor connected across said control winding, and means responsive to the voltage across said control winding for effectively disconnecting said capacitor from said control winding to prevent single-phase operation of said induction motor when said control voltage falls below a predetermined value.

5. A motor control system comprising an induction motor having an excitation winding and a control winding, means connecting said excitation winding to a source of alternating current, means supplying an alternating current control voltage to said control winding, and a tuning capacitor and a non-linear impedance connected in series across said control winding, said non-linear impedance having a relatively high impedance effectively to remove said capacitor from said control winding when the voltage across said control winding falls below a predetermined value required for normal two-phase operation of said induction motor and a relatively low impedance when the voltage applied to said control winding is at or above said predetermined value so that said capacitor is then effective to tune said control winding.

No references cited.